(12) United States Patent
Ceroll et al.

(10) Patent No.: US 7,727,003 B2
(45) Date of Patent: Jun. 1, 2010

(54) CORD PROTECTOR FOR POWER TOOLS

(75) Inventors: Warren A. Ceroll, Owings Mills, MD (US); Daniel Puzio, Baltimore, MD (US); Robert S. Gehret, Hampstead, MD (US); Richard C. Nickels, Jr., Hampstead, MD (US)

(73) Assignee: Black & Decker Inc., Newark, DE (US)

( * ) Notice: Subject to any disclaimer, the term of this patent is extended or adjusted under 35 U.S.C. 154(b) by 62 days.

(21) Appl. No.: 12/164,584

(22) Filed: Jun. 30, 2008

(65) Prior Publication Data

US 2009/0004908 A1 Jan. 1, 2009

Related U.S. Application Data

(63) Continuation-in-part of application No. 11/860,989, filed on Sep. 25, 2007.

(60) Provisional application No. 60/863,467, filed on Oct. 30, 2006.

(51) Int. Cl.
*H01R 13/56* (2006.01)

(52) U.S. Cl. ...................... 439/447; 439/456

(58) Field of Classification Search ......... 439/445–447, 439/456, 466, 468
See application file for complete search history.

(56) References Cited

U.S. PATENT DOCUMENTS

| | | |
|---|---|---|
| 1,098,775 A | 6/1914 | Wheelock |
| 1,880,069 A | 9/1932 | Becker |
| 1,950,036 A | 3/1934 | Preston |
| 2,365,785 A | 12/1944 | Tinnerman |
| 2,727,088 A * | 12/1955 | La Wall ...................... 439/447 |
| 2,800,933 A | 7/1957 | Michael |
| 2,945,085 A | 7/1960 | Billups |
| 3,056,852 A | 10/1962 | Sachs |
| 3,123,662 A | 3/1964 | Fink |
| 3,240,502 A | 3/1966 | Snyder |
| 3,279,014 A | 10/1966 | Fishcer |
| 3,546,502 A | 12/1970 | Botefuhr et al. |
| 3,689,014 A | 9/1972 | Fink |

(Continued)

FOREIGN PATENT DOCUMENTS

DE 3820741 12/1989

(Continued)

OTHER PUBLICATIONS

Frisch, Ulrich—Partial Search Report on corresponding European Patent Application No. 09151463.8—Apr. 14, 2009—Munich.

(Continued)

*Primary Examiner*—Tho D Ta
(74) *Attorney, Agent, or Firm*—Harness, Dickey & Pierce, P.L.C.

(57) ABSTRACT

A power tool having a housing, a motor disposed in the housing, a power cord connected to the motor, and a cord protector operably engaging the power cord. The cord protector comprising at least one elastically-deformable biasing member engaging the power cord and exerting a biasing force upon the power cord in response to a load being applied to the power cord and recovering to an initial position in response to removal of the load.

20 Claims, 13 Drawing Sheets

U.S. PATENT DOCUMENTS

| | | | |
|---|---|---|---|
| 3,958,300 A | | 5/1976 | Tanaka et al. |
| 4,078,309 A | | 3/1978 | Wilson |
| 4,095,043 A | | 6/1978 | Martin et al. |
| 4,289,923 A | | 9/1981 | Ebert |
| 4,323,725 A | | 4/1982 | Muller et al. |
| 4,389,082 A | | 6/1983 | Lingaraju |
| 4,406,064 A | | 9/1983 | Goss |
| 4,787,145 A | | 11/1988 | Klicker et al. |
| 5,850,698 A | | 12/1998 | Hurn et al. |
| 6,152,639 A | | 11/2000 | Hsu |
| 2003/0100214 A1 | * | 5/2003 | Miyamoto et al. .......... 439/456 |
| 2004/0147160 A1 | | 7/2004 | Weiss |

FOREIGN PATENT DOCUMENTS

| | | |
|---|---|---|
| DE | 20119603 U1 | 2/2002 |
| DE | 10360373 B3 | 3/2005 |
| JP | 07-022761 A | 1/1995 |
| JP | 2007022761 A | 2/2007 |
| JP | 2007103253 A | 4/2007 |
| WO | WO-2006093718 A1 | 9/2006 |

OTHER PUBLICATIONS

European Search Report and Annex to the European Search Report Dated Jul. 17, 2009.

International Search Report and Written Opinion Mailed Feb. 16, 2010.

* cited by examiner

CORD PROTECTOR FOR POWER TOOLS

CROSS-REFERENCE TO RELATED APPLICATIONS

This application is a continuation in part of U.S. application Ser. No. 11/860,989 filed on Sep. 25, 2007, which claims the benefit of U.S. Provisional Application No. 60/863,467 filed on Oct. 30, 2006, the disclosures of which are incorporated herein by reference.

FIELD

The present disclosure relates to various improvements for power tools, and particularly to a cord set load protector.

BACKGROUND AND SUMMARY

The statements in this section merely provide background information related to the present disclosure and may not constitute prior art.

A common field failure with heavier portable power tools, such as portable saws, is a separation of the power cord from the tool due to an impulse load, or jerk, applied to the cord. This can occur when the tool is dropped while the plug end of the power cord is secured, or when a user carries the tool or lowers it from floor to floor or down a ladder by holding the power cord.

To isolate the power cord conductors or connections from the high forces imposed by jerking the power cord, the power cord according to the present disclosure is installed in the tool housing with a small service loop, or extra length of cable, between the cord clamp and the portion of the tool housing that secures the cord protector. A crimp-on device is installed on the power cord cable next to the cord protector. When the cord is subjected to jerking, the cable moves axially relative to the cord protector. As the cable moves, the crimp-on device compresses the extended end of the cord protector absorbing energy and reducing the forces transmitted to the cord set conductors or connections that are disposed within the housing.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
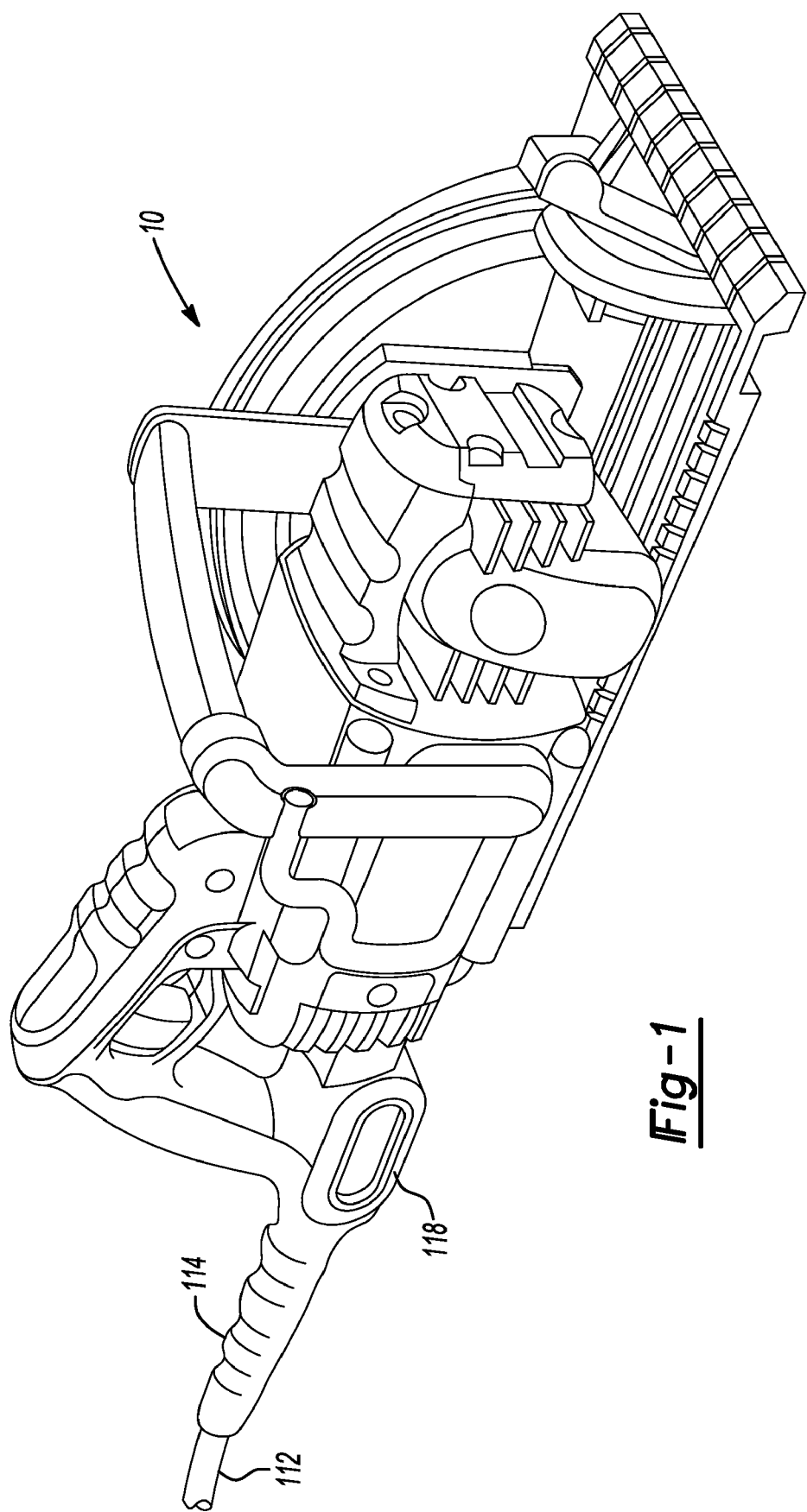
FIG. 1 is a perspective view of an exemplary worm drive saw with a tool hanger according to the principles of the present disclosure.

The following description is merely exemplary in nature and is not intended to limit the present disclosure, application, or uses. It should be understood that throughout the drawings, corresponding reference numerals indicate like or corresponding parts and features.

Figure 2:
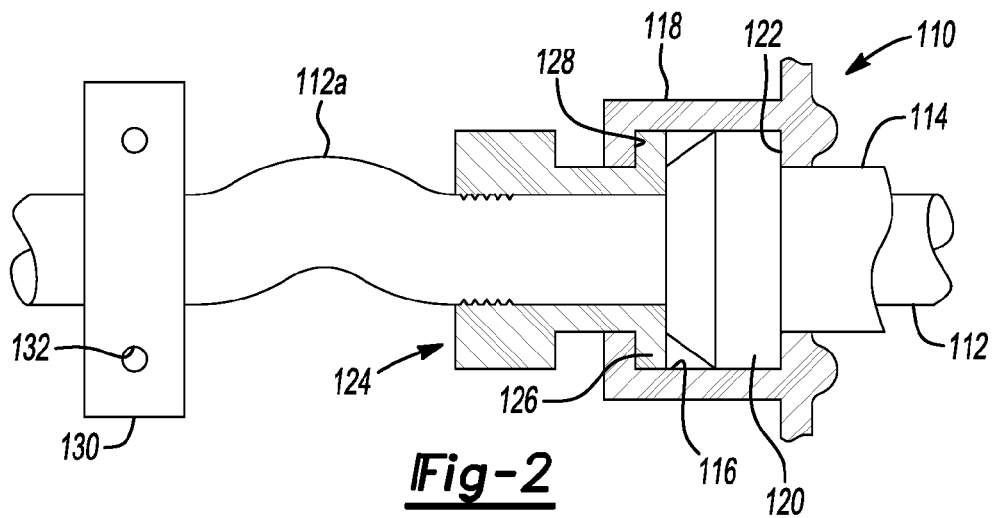
FIG. 2 is a cross-sectional view showing the cord set load protector according to the principles of the present disclosure, in an unloaded condition.

With reference to FIGS. 1 and 2, an exemplary power tool 10 is shown having a cord set load protector device 114 for preventing high forces imposed on a power cord 112 from impacting the connections of the cord 112 to the electrical power tool 10. As illustrated in FIG. 1, the power tool 10 includes a cord 112 and a cord protector 114 extending from the rear end of the tool. The cord protector 114 is mounted within a recess 116 provided in the power tool housing 118. The recess 116 can be square or round in cross-section and defines a cavity therein for receiving a radially extending flange portion 120 of the elastomeric cord protector 114. The radial extending flange portion 120 is disposed against a shoulder portion 122. A crimp-on device 124 is clamped or crimped onto the power cord 112 and includes a radially extending flange portion 126 which is disposed against an end portion of the cord protector 114 inside of the chamber 116 of housing 118. The flange portion 126 is disposed against a radially inwardly extending shoulder 128 of the cavity 116 provided in the housing 118.

The crimp-on device 124 engages the power cord so as to be axially and rotatably fixed to the power cord 112 in a manner that will be described in greater detail herein. The power cord 112 is also clamped to the tool housing by a cord clamp 130 provided within the power tool 10 in such a way that an extra cable length 112a is provided within the housing between the crimp-on device 124 and cord clamp 130. The cord clamp 130 can be mounted to the housing by fasteners 132 or by other known securing methods, such as rivets, welds, grommets, etc. The cord clamp 130 can be spaced from the recess 116 by up to several inches. Locating the cord clamp 130 further inward from the recess 116 improves cord flex durability by placing the cord stresses from the cord being flexed and the stresses on the cord due to the clamp at two different locations instead of both being generally at the same location. This improves the flex life of the conductors.

Figure 3:
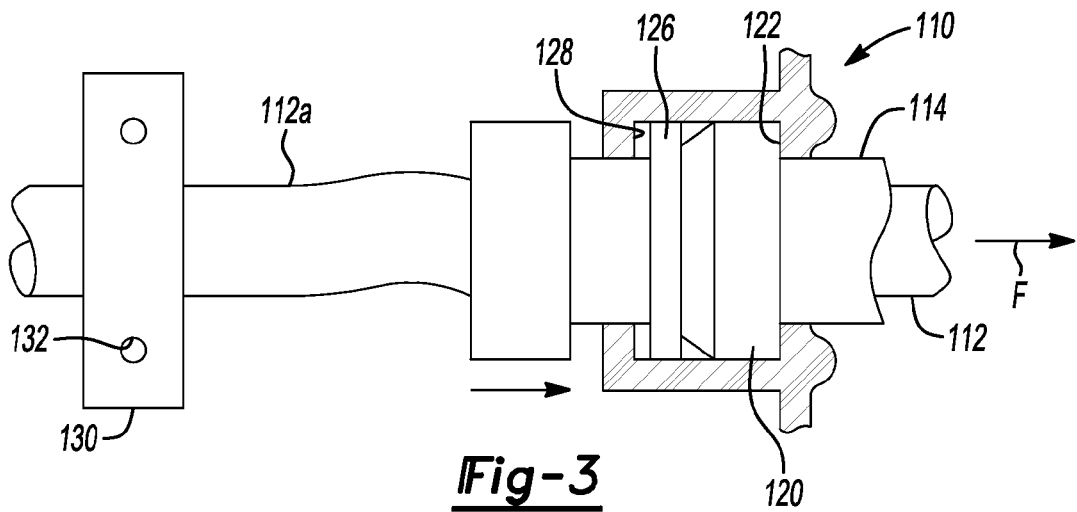
FIG. 3 is a view similar to FIG. 2 with a load applied to the cord.

When a large force F is applied to the power cord 112, as illustrated in FIG. 3, the power cord 112 is pulled in the axial direction of the force F. The movement of the power cord 112 relative to the housing 118 causes the crimp-on device 124 to move axially relative to the shoulder portion 128 so that the flange portion 126 of crimp-on device 124 compresses the flange portion 120 of cord protector 114, thereby absorbing the force exerted on the cord 112. The axial movement of the crimp-on device relative to the cord clamp 130 takes up some of the extra cable length 112a provided therebetween without exerting forces upon the cord clamp 130.

Figure 4:
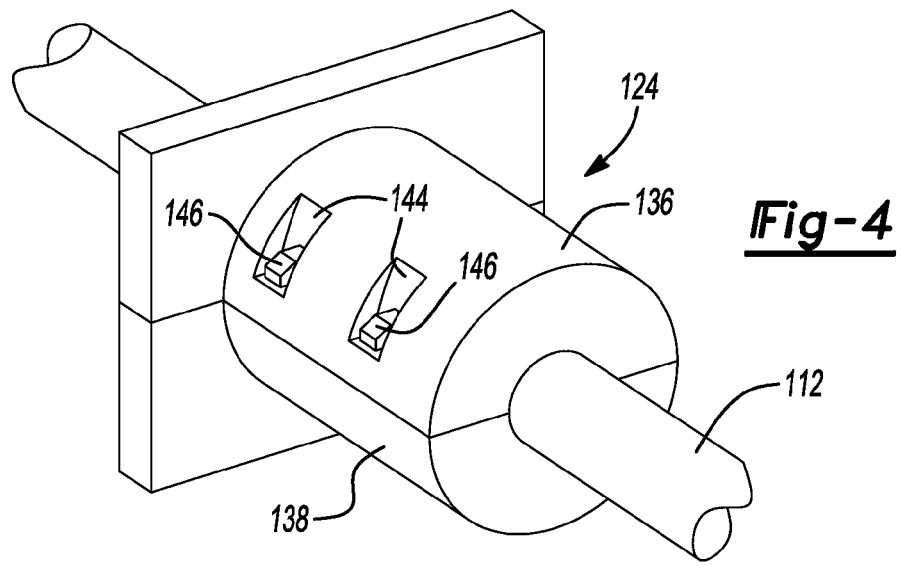
FIG. 4 is a perspective view of an exemplary cord clamp utilized with the cord set load protector according to the principles of the present disclosure.
Figure 5:
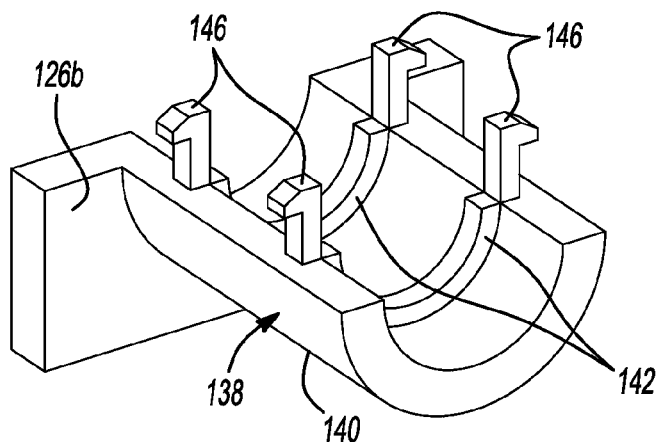
FIG. 5 is a perspective view of a first clamp half.
Figure 6:
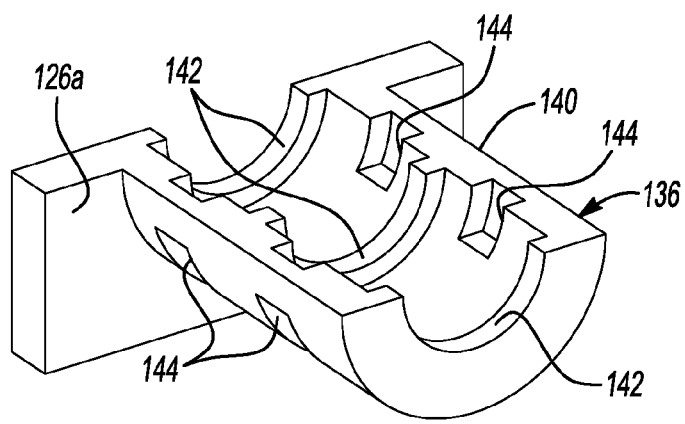
FIG. 6 is a perspective view of a second clamp half.

The crimp-on device 124 can take-on many forms. By way of example, as illustrated in FIGS. 4 and 6, the crimp-on device 124 can include a first clamp half 136 and a second clamp half 138. Each clamp half 136, 138 is provided with semi-cylindrical body portions 140 each provided with a plurality of radially inwardly extending ribs 142 designed to engage and clamp against the outer surface of the power cord 112. The first clamp half 136 is provided with a plurality of apertures 144 each adapted to receive a plurality of corresponding locking fingers 146 provided on the second clamp half 138. Each of the first and second clamp halves 136, 138 include radial flange portions 126a, 126b, respectively, which define the radially extending flange portion 126 of the crimp-on device 124. The locking fingers 146 secure the second clamp half 138 to the first clamp half 136 in a clamping engagement on the power cord 112 so as to prevent axial or rotational movement of the power cord 112 relative to the clamp device 124. It should be understood that other clamp or crimp-on arrangements can be utilized with the cord-set load protector 110, according to the principles of the present disclosure.

Figure 7:
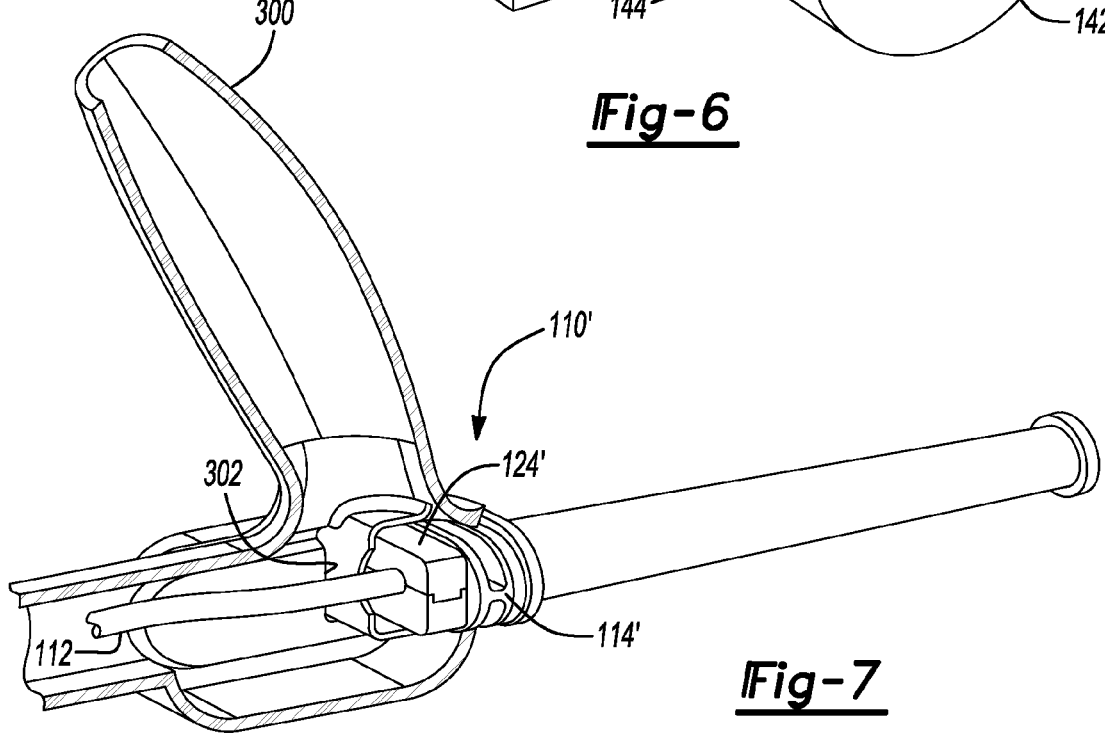
FIG. 7 is a perspective view of a cord set load protector design with the handle partially removed for illustrative purposes according to some embodiments.

With reference to FIG. 7, an alternative cord set load protector 110' is shown including a split clamp device 124' received in a recess 302 within the handle section 300 to prevent the assembly from twisting or being pushed into the handle set. The split clamp 124' is independent of the handle set 300 and traps the complete cord set 112 and secondary wrap of filler strands. The cord protector 114' includes added material at the mounting end that prevents twist and creates a spring to absorb shock.

Figure 8:
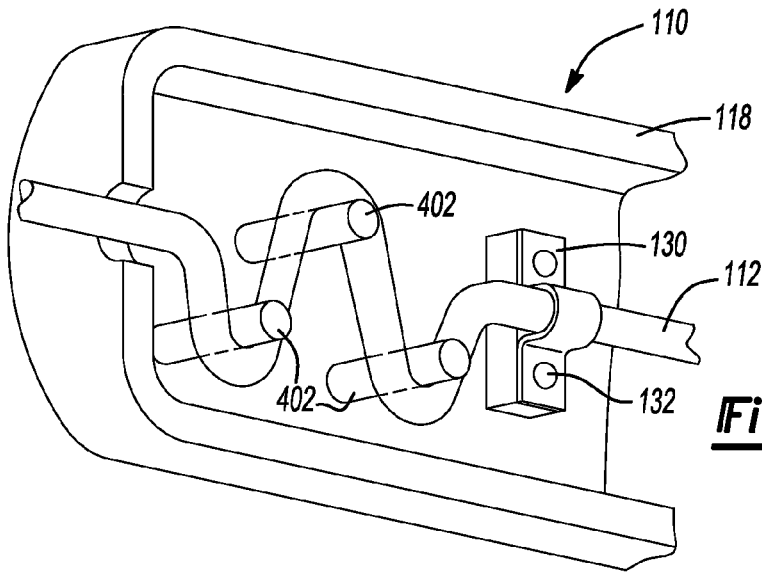
FIG. 8 is a perspective view of a cord set load protector design according to some embodiments having a serpentine pattern.
Figure 9:
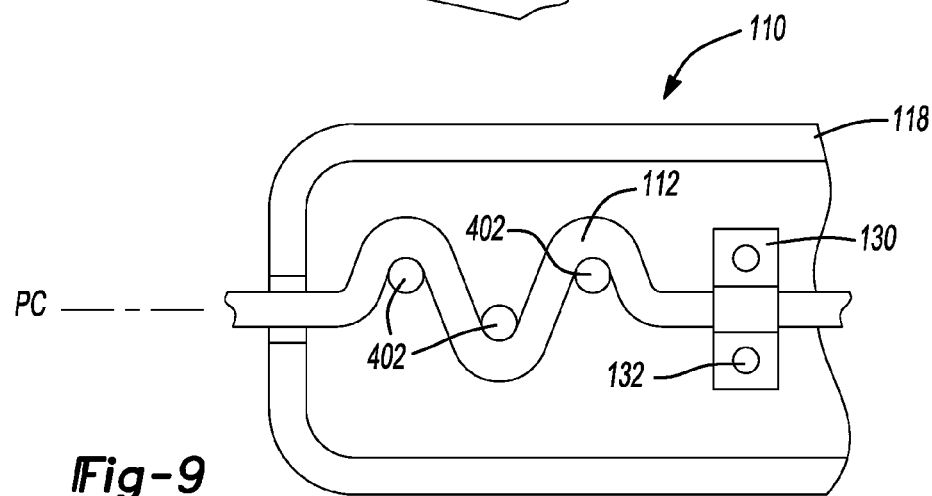
FIG. 9 is a front view of the cord set load protector design according to FIG. 8 in an initial position.
Figure 10:
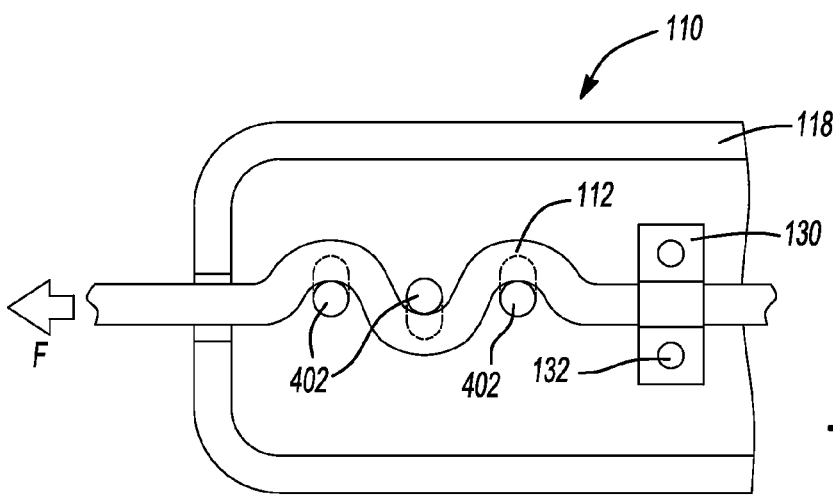
FIG. 10 is a front view of the cord set load protector design according to FIG. 8 in a deflected position.
Figure 11:
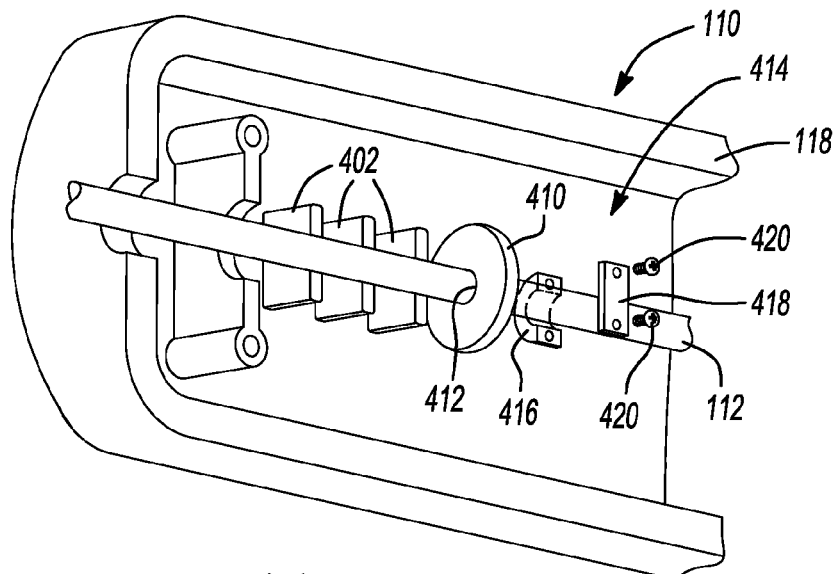
FIG. 11 is a perspective view of a cord set load protector design according to some embodiments having an engagement plate.
Figure 12:
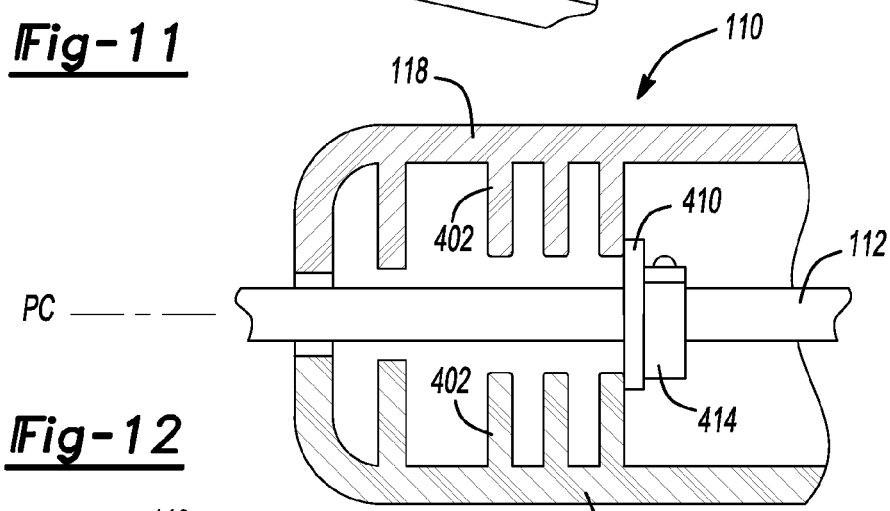
FIG. 12 is a front view of the cord set load protector design according to FIG. 11 in an initial position.
Figure 13:
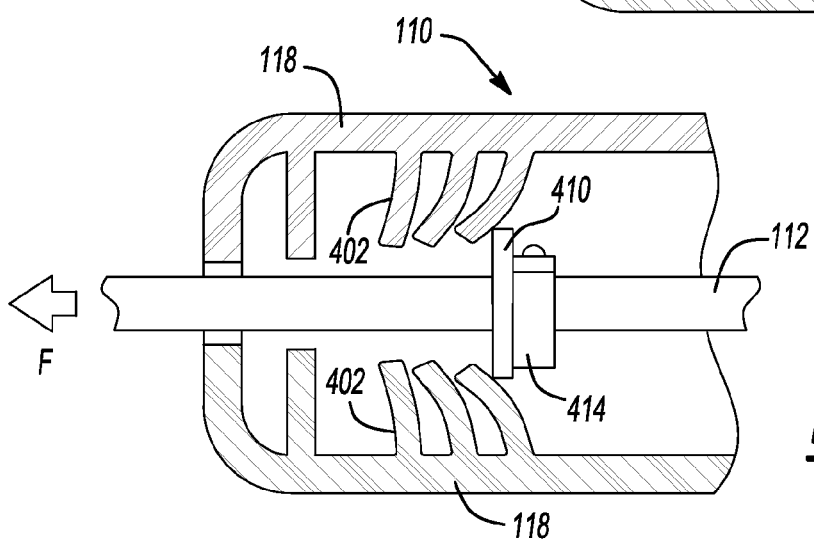
FIG. 13 is a front view of the cord set load protector design according to FIG. 11 in a deflected position.

In some embodiments, as illustrated in FIGS. 8-10, cord set load protector 110 can comprise a plurality of biasing members, such as ribs, posts, and/or springs, extending within the housing to provide, at least in part, shock absorbing function. Specifically, housing 118 can comprise two or more biasing members 402 extending inwardly from housing 118 (such as three biasing members 402 as illustrated). A longitudinal axis of each of biasing members 402 can be orthogonal to power cord 112 prior to deflection of biasing members 402. Biasing members 402 can be arranged to provide a serpentine routing of power cord 112 through housing 118. Although it should be appreciated that other routing configurations can be used within the scope of the present teachings. More particularly, as illustrated in FIG. 9, biasing members 402 can be arranged such that each is offset laterally relative to an axis PC. The exact amount of this offset can be determined based upon the compliancy desired in cord set load protector 110, characteristics of power cord 112, and the physical properties of biasing members 402.

It should be appreciated that biasing members 402 can include features, materials, or employ other manufacturing techniques directed to tailoring a compliant response when under load (i.e. a biasing profile). For instance, in some embodiments, biasing members 402 can comprise a molded or formed member having a cross-sectional shape that is non-cylindrical, such as tapered, notched, and/or non-uniform. This cross-sectional shape can provide a non-linear compliant response when under load to permit initial deflection under light loads and progressively less deflection under heavier loads.

Furthermore, with continued reference to FIGS. 8-10, in some embodiments, biasing members 402 of cord set load protector 110 can be sized and made of material to provide a predetermined compliancy. For instance, biasing members 402 can have a diameter sufficient to enable elastic deformation. Similarly, biasing members 402 can be made of a material that enables such elastic deformation. Still further, a combination of sizes and materials can be provided to achieve such elastic deformation. Additionally, biasing members 402 can be integrally formed with housing 118 with a similar material as housing 118 or with a differing material.

During use, if sufficient force is applied to power cord 112, the associated force is transmitted against biasing members 402 to deflect biasing members 402 in a direction such that a degree of the serpentine shape is reduced (see progressive steps of FIGS. 9 (undeflected) and 10 (deflected)). This deflection provides force absorption along axis PC.

Figure 23:
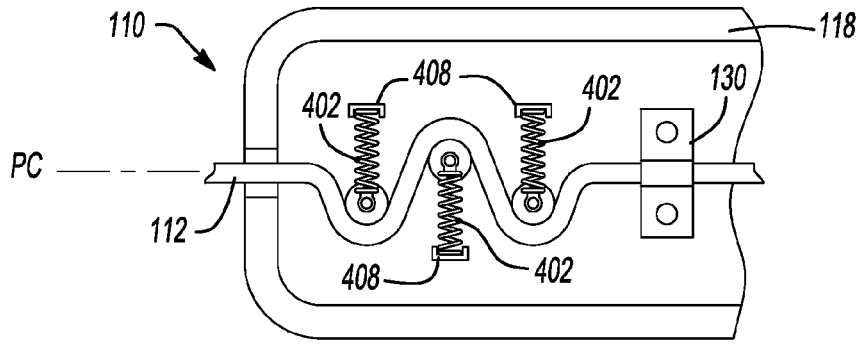
FIG. 23 is a front view of the cord set load protector design in an initial position according to some embodiments having extension springs.
Figure 24:
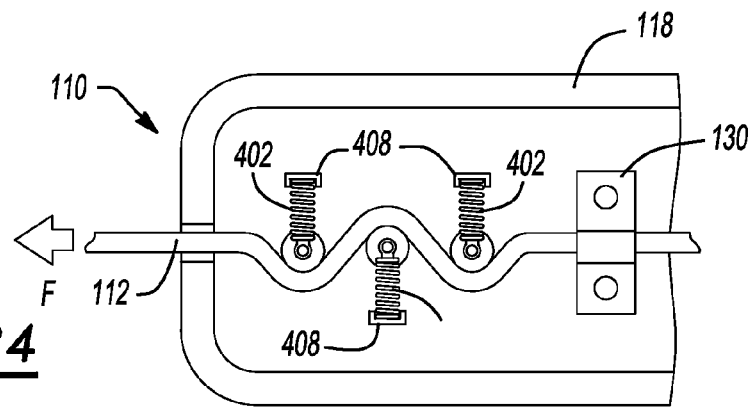
FIG. 24 is a front view of the cord set load protector design according to FIG. 23 in a deflected position.
Figure 25:
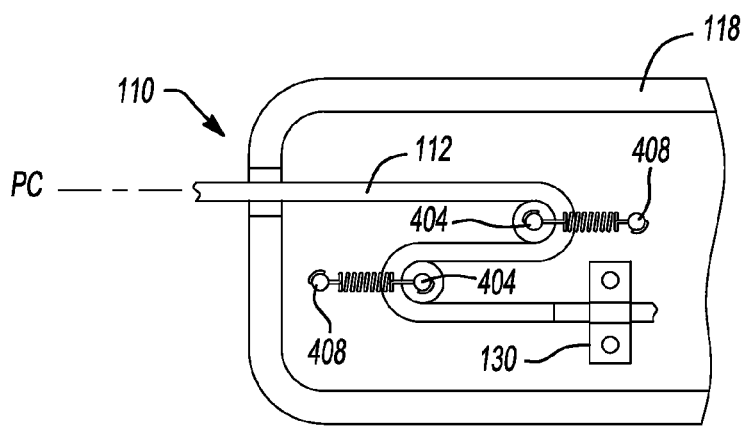
FIG. 25 is a front view of the cord set load protector design in an initial position according to some embodiments having extension springs.
Figure 26:
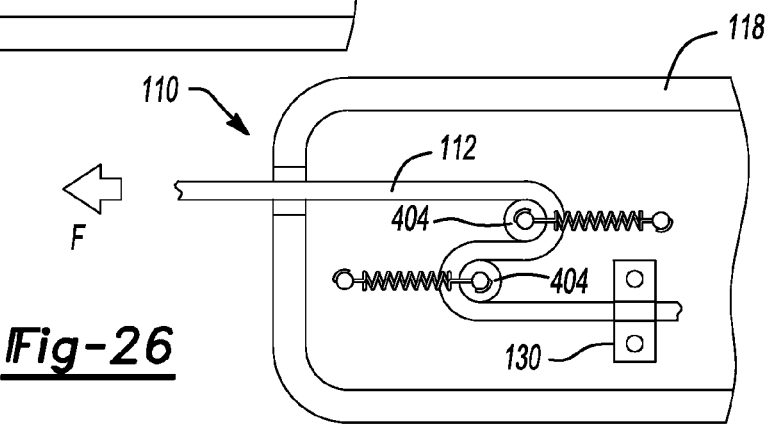
FIG. 26 is a front view of the cord set load protector design according to FIG. 25 in a deflected position.

With reference to FIGS. 23-26, it should be appreciated that biasing members 402 can comprise spring members operably engaging power cord 112 to provide a biasing force causing power cord 112 to deflect into a serpentine configuration. In such embodiments, biasing member 402, comprising a spring member, can be coupled at one end to housing 118 or other retaining structure 408 and at the other end to a rotatable pulley 404 (FIGS. 25 and 26) or engagement member 406 (FIGS. 23 and 24). Rotatable pulley 404 can be used to facilitate non-binding translation of power cord 112 relative to biasing member 402. When such translation of power cord 112 is minimal, engagement member 406 can be used. Biasing members 402, comprising spring members, can include varying spring rates relative to each other to enhance or tailor a desired biasing profile.

In some embodiments, as illustrated in FIGS. 11-15, biasing members 402 can be ribs extending inwardly from opposing sides of housing 118 and can be configured to engage an engagement plate 410 fixedly coupled to power cord 112 for movement therewith. More particularly, engagement plate 410 can comprise a circular disk having an aperture 412 sized to receive power cord 112 there through. Engagement plate 410 can be retained in position relative to power cord 112 via an abutment clamp 414. In some embodiments, abutment clamp 414 can include a U-shaped main member 416, a backside retaining plate 418, and a plurality of fasteners 420 for clampingly coupling U-shaped main member 416 and backside retaining plate 418 about power cord 112 for movement therewith. It should be appreciated that U-shaped main member 416 can be sized to define an interference fit with power cord 112 when abutment clamp 414 is mounted thereto. It should also be appreciated that alternative abutment clamps or retaining members can be used. It should also be appreciated that engagement plate 410 and abutment clamp 414 can be formed of a single, integral member and can have a variety of shapes found to be properly engagable with biasing members 402.

Still referring to FIGS. 11-15, it can be seen that biasing members 402 can be formed as a series of ribs having planes generally orthogonal to power cord 112. Biasing members 402 can be arranged on opposing sides of power cord 112, or circumferentially about power cord 112, to apply a balanced cord protection force. As described herein, biasing members 402 of cord set load protector 110 can be sized and made of material(s) to provide a predetermined compliance. For instance, biasing members 402 can have a constant thickness, a varying thickness along its length, a varying thickness relative to other biasing members, be made of a compliant material, or a combination of these properties to enable elastic deformation along a predetermined biasing profile. Additionally, biasing members 402 can be arranged relative to each other such that a first of the biasing members 402 is deflected and engages a second of the biasing members 402 (and so on) to provide a compounding biasing force.

During use, if sufficient force is applied to power cord 112, power cord 112 is translated thereby similarly translating engagement plate 410 and abutment clamp 414 to the left in the figures. This translation causes engagement plate 410 to engage the series of biasing members 402 in succession and thus the associated force is transmitted against biasing members 402 to deflect biasing members 402. This deflection provides force absorption along axis PC.

Figure 14:
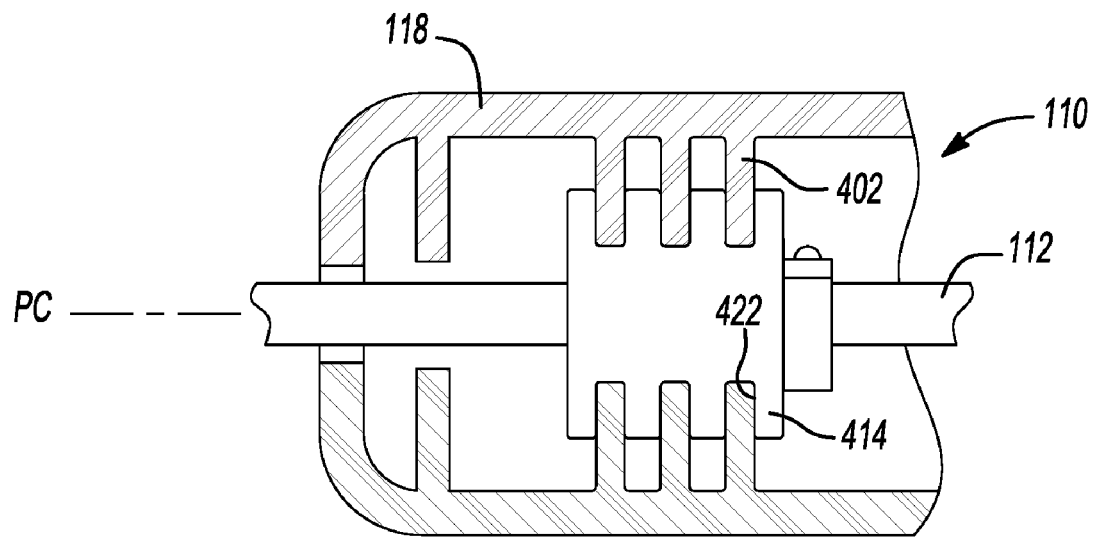
FIG. 14 is a front view of the cord set load protector design in an initial position according to some embodiments having an engagement plate.
Figure 15:
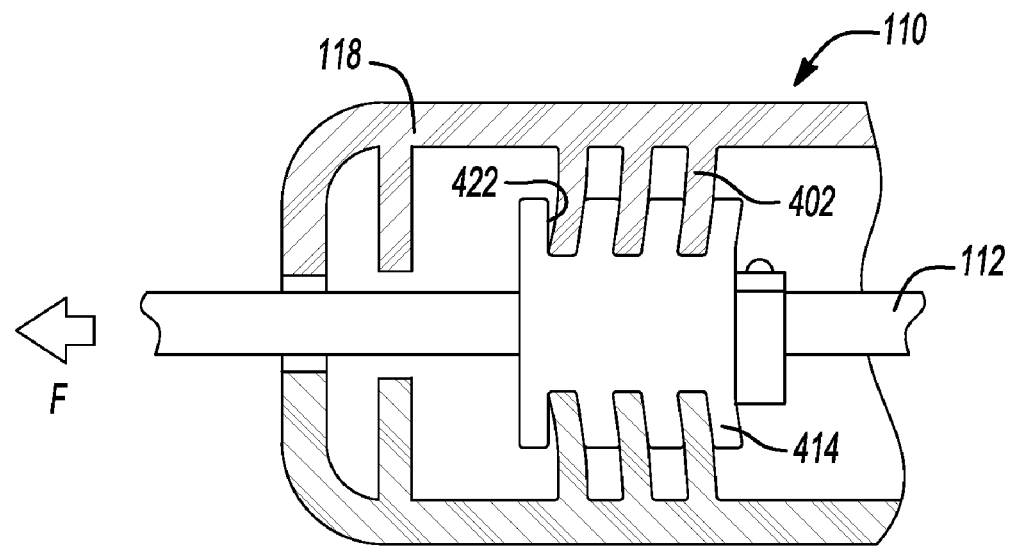
FIG. 15 is a front view of the cord set load protector design according to FIG. 14 in a deflected position.

In some embodiments, as illustrated in FIGS. 14 and 15, abutment clamp 414 can comprise an elongated member coupled to power cord 112 for movement therewith. In this embodiment, abutment clamp 414 can comprise a series of circumferential slots 422 sized to receive respective ends of biasing members 402 therein. In this way, each of the plurality of biasing members 402 can simultaneously be actuated or deflected upon initial movement of power cord 102 along axis PC, thereby providing a generally linear biasing response. Abutment clamp 414 can be made of a flexible or elastomeric material to provide biasing relative to biasing members 402, as is illustrated in FIG. 15.

Figure 16:
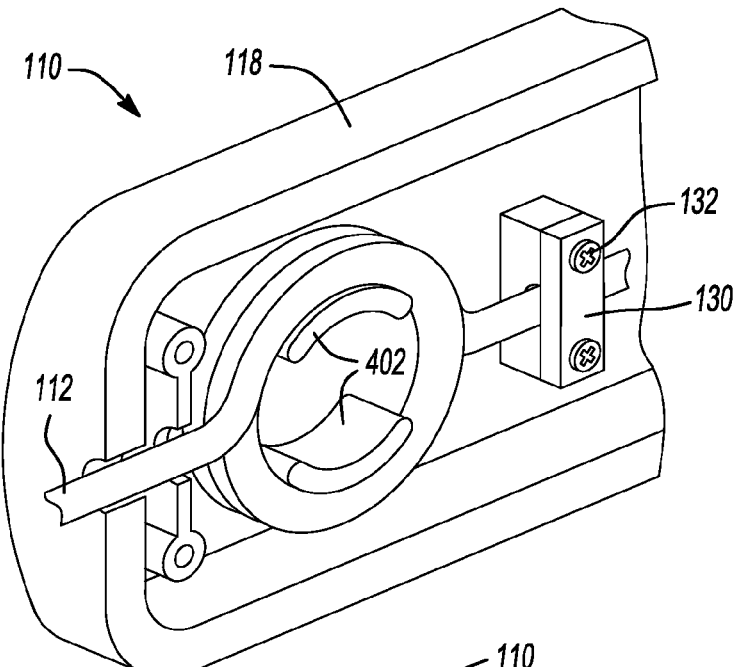
FIG. 16 is a perspective view of a cord set load protector design according to some embodiments having inwardly positioned biasing members.
Figure 17:
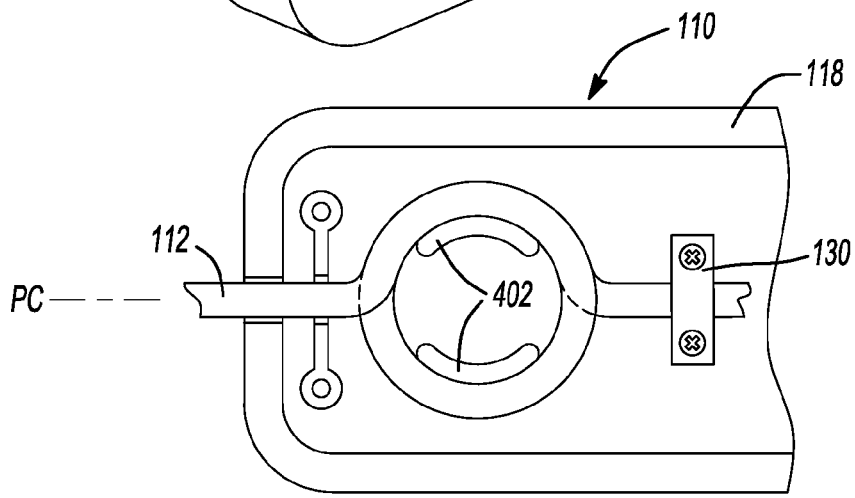
FIG. 17 is a front view of the cord set load protector design according to FIG. 16 in an initial position.
Figure 18:
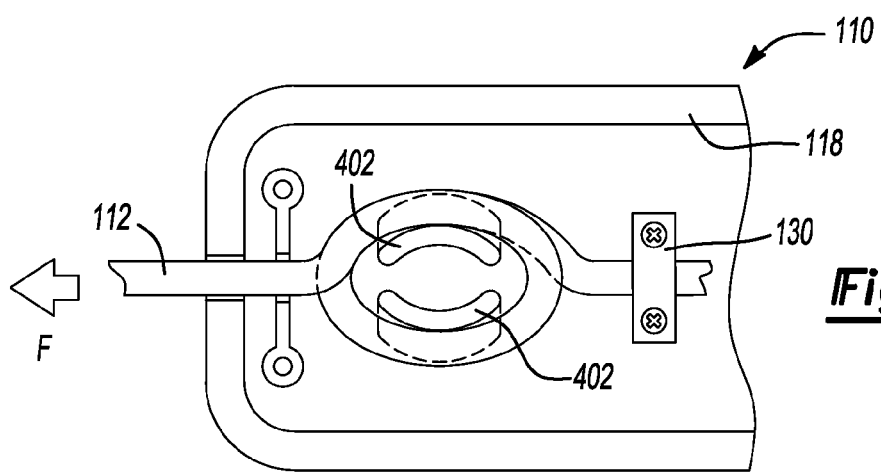
FIG. 18 is a front view of the cord set load protector design according to FIG. 16 in a deflected position.
Figure 19:
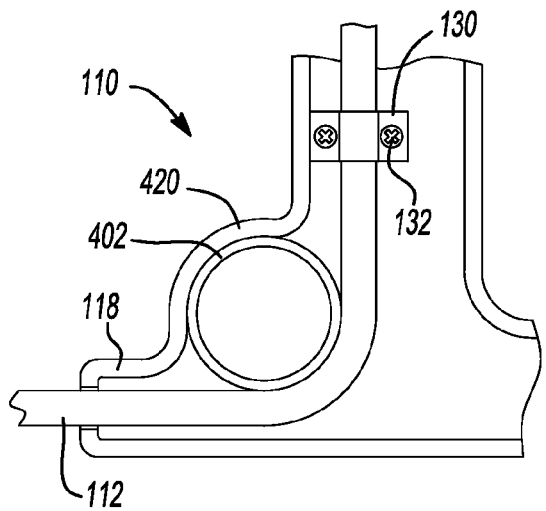
FIG. 19 is a front view of the cord set load protector design in an initial position according to some embodiments.
Figure 20:
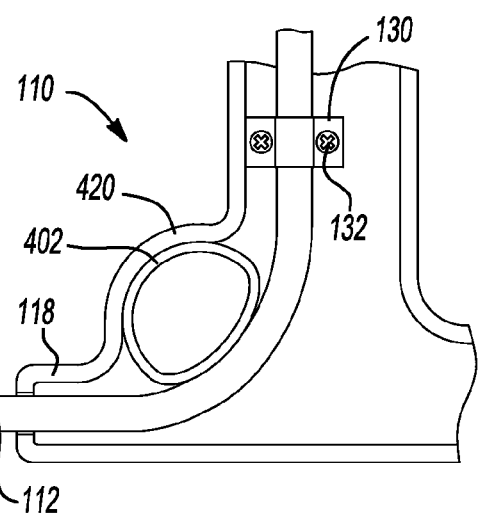
FIG. 20 is a front view of the cord set load protector design according to FIG. 19 in a deflected position.
Figure 21:
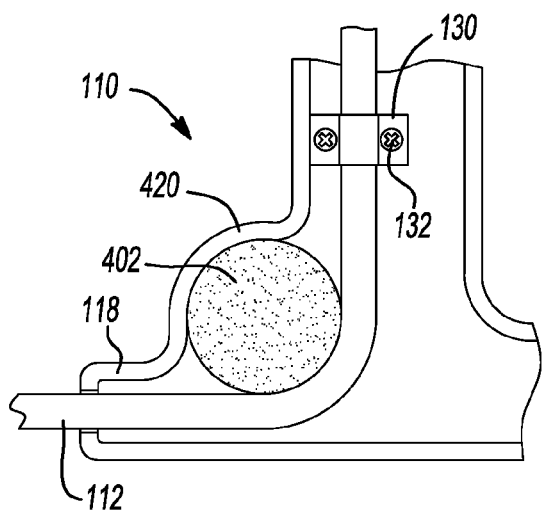
FIG. 21 is a front view of the cord set load protector design in an initial position according to some embodiments.
Figure 22:
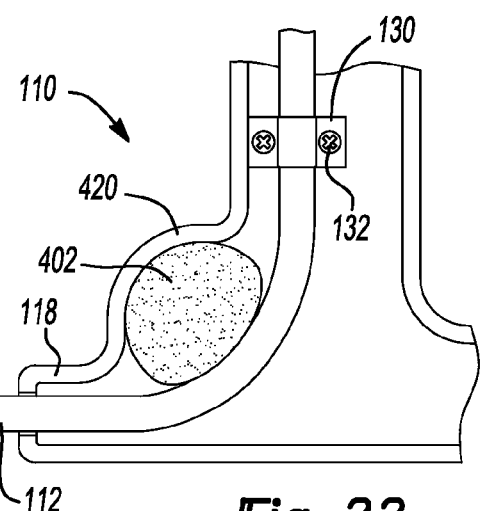
FIG. 22 is a front view of the cord set load protector design according to FIG. 21 in a deflected position.

In some embodiments, as illustrated in FIGS. 16-18, biasing members 402 can be ribs extending inwardly from opposing sides of housing 118 and can be positioned within a center portion of a loop formed in power cord 112. That is, biasing members 402 can be formed as two or more ribs around which power cord 112 can pass. Biasing members 402 can have an arcuate shape closely conforming to a predetermined loop radius of power cord 112. It should be appreciated that the loop radius should be selected so as not to overly strain power cord 112.

During use, if sufficient force is applied to power cord 112, power cord 112 is translated thereby exerting an inwardly directed compression force on biasing members 402 causing biasing members 402 to deflect from a first position (FIG. 17) to a second position (FIG. 18). This deflection provides force absorption along axis PC.

Referring now to FIGS. 19-22, in some embodiments, biasing member 402 can comprise a member formed separate from housing 118, such as a spring steel ring (FIGS. 19 and 20), an elastomeric or compressible member (FIGS. 21 and 22), a hollow sealed member, or other energy absorbing member. In such embodiments, biasing member 402 can be positioned to an inner corner of housing 118 such that when force is applied to power cord 112, such force is translated to biasing member 402, thereby compressing biasing member 402 against a sidewall of housing 118. In some embodiments, housing 118 can comprise a contour 420 for receiving biasing member 402 therein and retaining biasing member 402 in a predetermined position. It should be appreciated that biasing member 402 can be made of any material that provides sufficient elastic/compliant properties, such as spring steel, elastomers, and the like.

Figure 27:
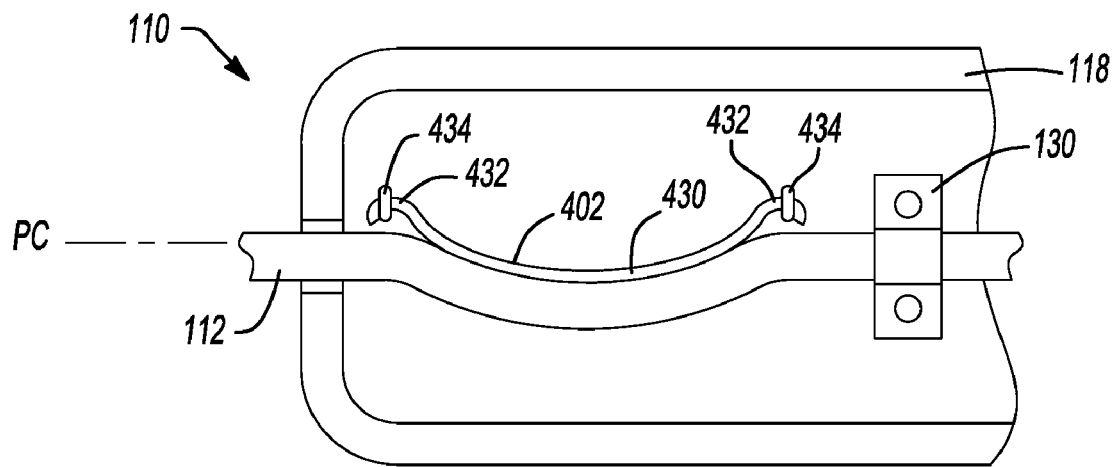
FIG. 27 is a front view of the cord set load protector design in an initial position according to some embodiments having a leaf spring.
Figure 28:
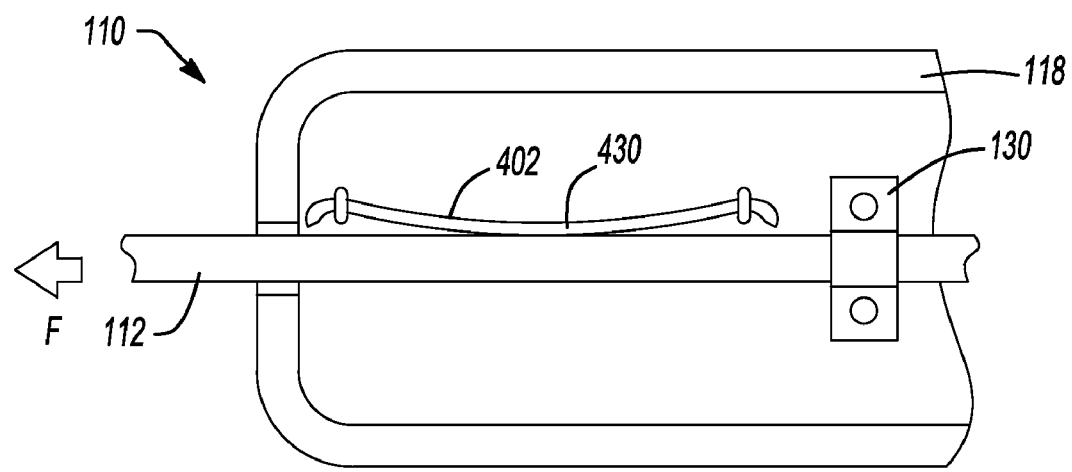
FIG. 28 is a front view of the cord set load protector design according to FIG. 27 in a deflected position.

Turning now to FIGS. 27 and 28, in some embodiments, biasing member 402 can comprise a leaf spring 430. Leaf spring 430 can include a generally arcuate member being made of material sufficient to elastically deflect and provide a biasing force to power cord 112. In some embodiments, leaf spring 430 is retained on opposing ends 432 by retaining members 434. Retaining members 434 can be fixedly coupled to housing 118. It should be appreciated that in some embodiments retaining members 434 can be sized to permit free slidable movement of leaf spring 430 relative thereto (see FIG. 28).

During use, if sufficient force is applied to power cord 112, power cord 112 is straightened thereby exerting an upwardly directed force on biasing members 402 causing leaf spring 430 to deflect from a first position (FIG. 27) to a second position (FIG. 28). This deflection provides force absorption along axis PC.

Figure 29:
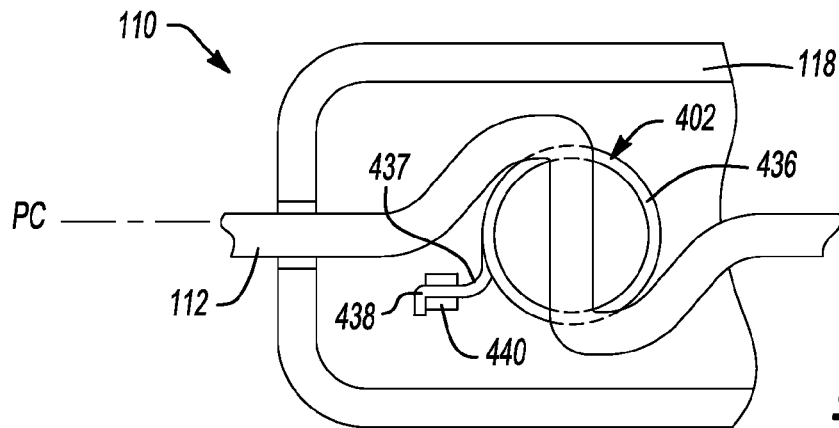
FIG. 29 is a front view of the cord set load protector design in an initial position according to some embodiments having a torsion spring.
Figure 30:
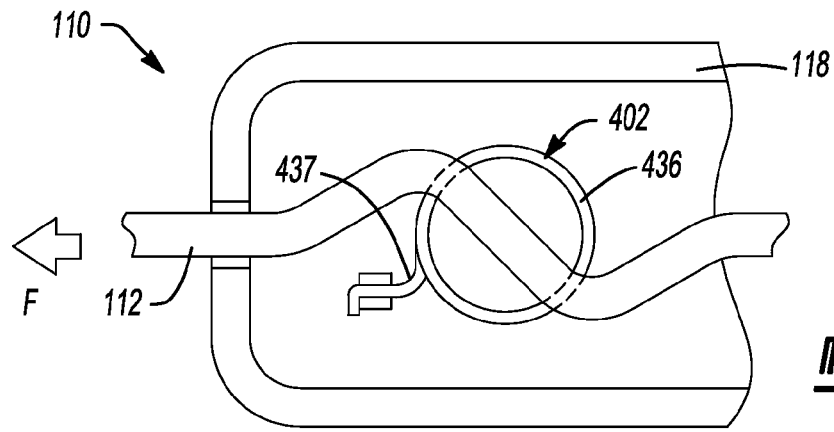
FIG. 30 is a front view of the cord set load protector design according to FIG. 29 in a deflected position.
Figure 31:
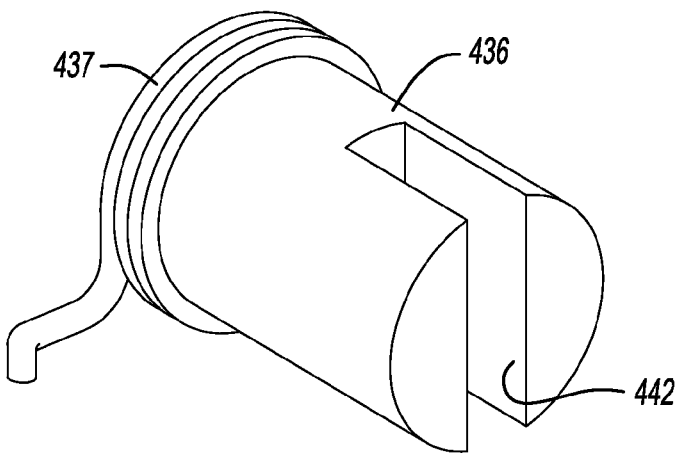
FIG. 31 is an enlarged perspective view of the biasing member of FIG. 29.

Turning now to FIGS. 29-31, in some embodiments, biasing member 402 can comprise a torsion spring member 436. In some embodiments, torsion spring member 436 includes a torsion spring 437 that is retained on one end 438 by retaining members 444. Retaining members 440 can be fixedly coupled to housing 118. Torsion spring member 436 can comprise a slot portion 442 formed therein for receiving and retaining power cord 112.

During use, if sufficient force is applied to power cord 112, power cord 112 is straightened thereby exerting an torsion force on biasing members 402 causing torsion spring member 436 to rotate counter-clockwise in the figures against the biasing force of torsion spring 437 from a first position (FIG. 29) to a second position (FIG. 30). This deflection provides force absorption along axis PC.

Figure 32:
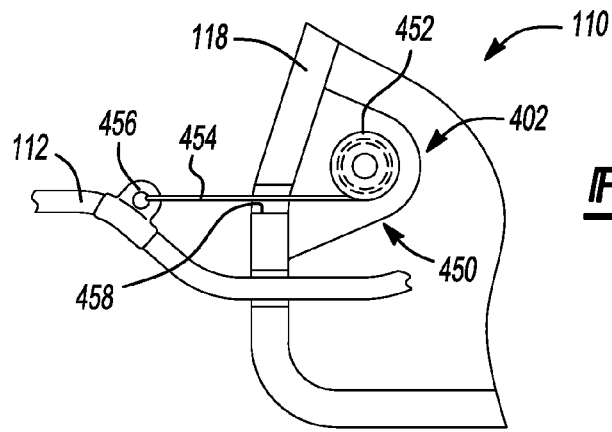
FIG. 32 is a front view of the cord set load protector design in an initial position according to some embodiments having a tether system.
Figure 33:
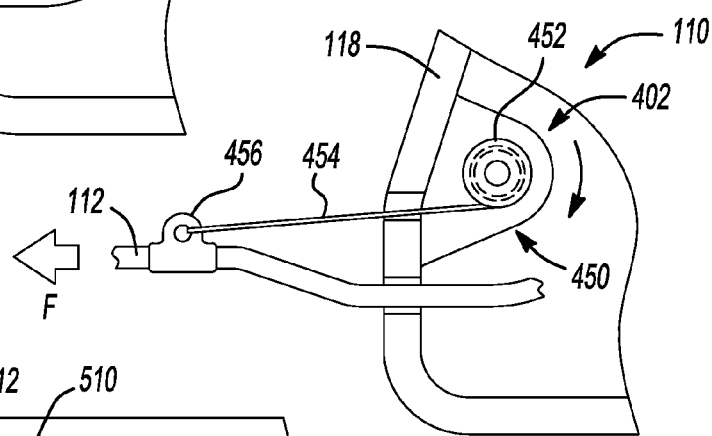
FIG. 33 is a front view of the cord set load protector design according to FIG. 32 in a deflected position.

With reference to FIGS. 32 and 33, in some embodiments, biasing member 402 can comprise a biased tether system 450. Biased tether system 450 can comprise a biasing reel 452 retaining a tether 454. Tether 454 can comprise a coupler member 456 fixedly coupled to power cord 112. Biased tether system can be disposed such that at least a portion of thereof extends outside of housing 118. In such embodiments, an aperture 458 is formed in housing 118 to permit tether 454 to pass therethrough.

Biasing reel 452 can be spring biased to provide a retracting force on power cord 112. In this regard, during use, if sufficient force is applied to power cord 112, power cord 112 is straightened thereby exerting a force on tether 454 which is transmitted to biasing reel 452. Such force caused biasing reel 452 to rotate clockwise in the figures against the biasing force thereof from a first position (FIG. 32) to a second position (FIG. 33). This deflection provides force absorption along axis PC.

Figure 34:
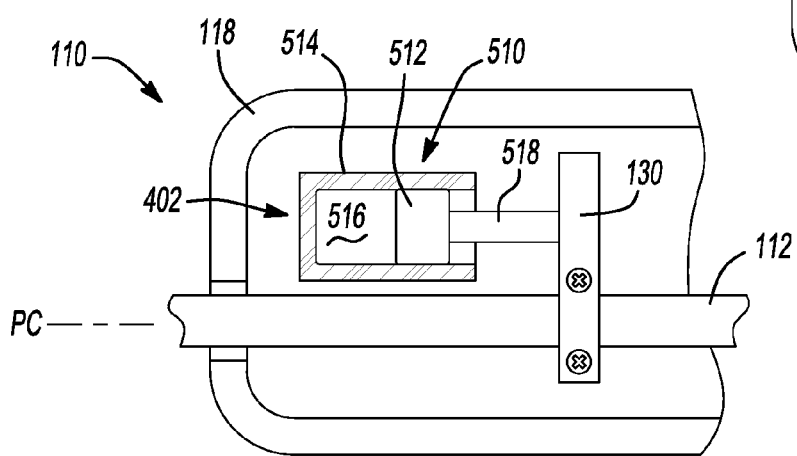
FIG. 34 is a front view of the cord set load protector design in an initial position according to some embodiments having a piston device.
Figure 35:
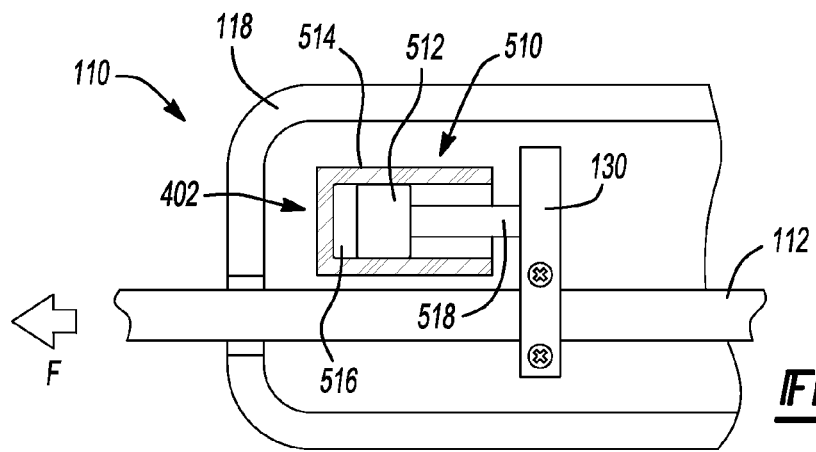
FIG. 35 is a front view of the cord set load protector design according to FIG. 34 in a deflected position.

Referring now to FIGS. 34 and 35, in some embodiments, biasing member 402 can comprise a piston device 510 to provide, at least in part, shock absorbing function. Specifically, in some embodiments, piston device 510 can be disposed within housing 118 or, in some embodiments, can be formed outside of housing 118. With particular reference to FIGS. 34 and 35, piston device 510 can comprise a piston member 512 slidably disposed within a piston chamber 514. Piston member 512 can define a seal between piston member 512 and piston chamber 514 to create a compressible pressure volume 516. Piston member 512 can comprise a rod 518 fixedly coupled to a cord clamp 130, which in turn is fixedly coupled to power cord 112 for movement therewith. Piston chamber 514 can be fixedly coupled to housing 118 or integrally formed therewith. In some embodiments, piston chamber 514 can be retained by a retainer structure (not shown) separate from housing 118.

During use, if sufficient force is applied to power cord 112, power cord 112 is translated thereby similarly translating piston member 512 relative to piston chamber 514 to the left in the figures. This translation causes piston member 512 to compress a fluid, such as air, gas, or liquid, within pressure chamber 516 thereby creating an opposing biasing force. This compression of fluid within pressure chamber 516 provides force absorption along axis PC at an increasing rate.

Figure 36:
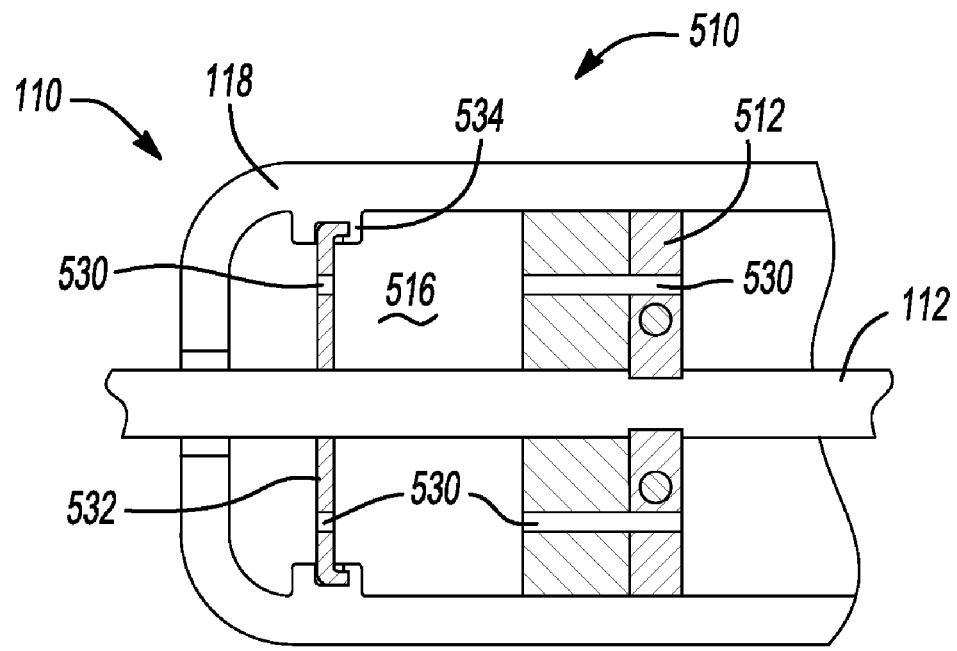
FIG. 36 is a front view of the cord set load protector design in an initial position according to some embodiments having a piston device and orifice channels.
Figure 37:
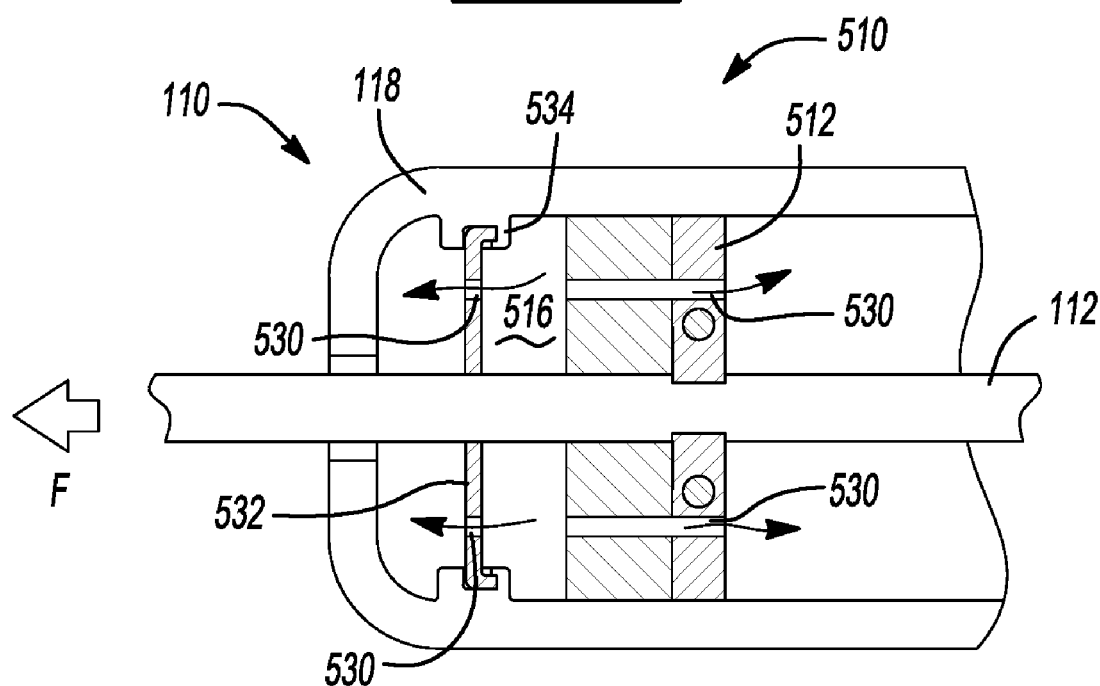
FIG. 37 is a front view of the cord set load protector design according to FIG. 36 in a deflected position.

Turning now to FIGS. 36 and 37, in some embodiments, piston device 510 can be disposed within housing 118 such that piston member 512 slidably engages piston chamber 514. Piston chamber 514 can be formed as part of housing 118 such that piston member 512 slidably engages an inner wall of housing 118 to form a seal therewith and define compressible pressure volume 516. Piston member 512 can be directly, fixedly coupled to power cord 112 for movement therewith. In some embodiments, piston member 512 can comprise one or more orifice channels 530 extending therethrough. Orifice channels 530 can provide a regulated flow of fluid (i.e. air) from compressible pressure volume 516 to atmosphere. In other words, orifice channels 530 can be sized to permit a predetermine rate of fluid evacuation to produce a desired biasing profile. In some embodiments, an orifice plate 532 can be disposed in housing 118, engaging retaining features 534 formed in housing 118, to define compressible pressure volume 516. Orifice plate 532 can comprise one or more orifice channels 530 formed therethrough to further enhance and tailor regulated flow of fluid (i.e. air) to and from compressible pressure volume 516

During use, if sufficient force is applied to power cord 112, power cord 112 is translated thereby similarly translating piston member 512 relative to piston chamber 514 to the left in the figures. This translation causes piston member to compress a fluid, such as air, gas, or liquid, within pressure chamber 516 thereby creating an opposing biasing force. This compression of fluid within pressure chamber 516 provides force absorption along axis PC at an increasing rate.

It should be appreciated from the foregoing that one or more of the disclosed embodiments can be used concurrently to provide improved tailoring of the biasing profile and increased cord protection.

What is claimed is:

1. A power tool comprising:
   a tool body having a housing;
   a motor disposed in said housing;
   a power cord connected to said motor; and
   a cord protector operably engaging said power cord, said cord protector comprising at least one elastically-deformable biasing member engaging said power cord and exerting a biasing force upon said power cord in response to a load being applied to said power cord, said biasing member recovering to an initial position in response to removal of said load, said at least one elastically-deformable biasing member extending from said housing.

2. The power tool according to claim 1 wherein said at least one elastically-deformable biasing member comprises a plurality of biasing members extending from said housing, said plurality of biasing members being deflectable between an initial position and a deflected position.

3. The power tool according to claim 2 wherein said plurality of biasing members are offset along an axis of said power cord, said power cord being routed about said plurality of biasing members to define a serpentine pattern.

4. The power tool according to claim 3, further comprising:
   a clamping members coupling a portion of said power cord to said housing such that when said load is applied to said power cord, said plurality of biasing members deflect to said deflected position.

5. The power tool according to claim 1 wherein said at least one biasing member is an elongated member.

6. The power tool according to claim 5 wherein said elongated member is cylindrical.

7. The power tool according to claim 5 wherein said elongated member is non-uniform.

8. A power tool, comprising:
   a tool body having a housing;
   a motor disposed in said housing;
   a power cord connected to said motor; and
   a cord protector operably engaging said power cord, said cord protector comprising at least one elastically-deformable biasin member engaging said power cord and exerting a biasing force upon said power cord in response to a load being applied to said power cord, said biasing member recovering to an initial position in response to removal of said load, said at least one biasing member is an extension spring, said extension spring being coupled at one end to said housing and engaging said power cord at an opposing end.

9. A power tool, comprising:
a tool body having a housing;
a motor disposed in said housing;
a power cord connected to said motor;
a cord protector operably engaging said power cord, said cord protector comprising at least one elastically-deformable biasing member engaging said power cord and exerting a biasing force upon said power cord in response to a load being applied to said power cord, said biasing member recovering to an initial position in response to removal of said load; and
an engagement plate fixedly coupled to said power cord; said engagement plate engaging said at least one biasing member.

10. The power tool according to claim 9 wherein said cord protector comprises a plurality of biasing members extending from said housing, said plurality of biasing members being disposed radially about an axis of said power cord.

11. The power tool according to claim 10 wherein said engagement plate engages at least two of said plurality of biasing members sequentially in response to said load.

12. The power tool according to claim 10 wherein said engagement plate engages at least two of said plurality of biasing members simultaneously in response to said load.

13. The power tool according to claim 1 wherein said cord protector comprises a plurality of biasing members extending from said housing, said plurality of biasing members being deflectable radially inwardly between an initial position and a deflected position.

14. The power tool according to claim 13 wherein said power cord is positioned circularly about said plurality of biasing members.

15. A power tool, comprising:
a tool body having a housing;
a motor disposed in said housing;
a power cord connected to said motor; and
a cord protector operably engaging said power cord, said cord protector comprising at least one elastically-deformable biasing member engaging said power cord and exerting a biasing force upon said power cord in response to a load being applied to said power cord, said biasing member recovering to an initial position in response to removal of said load, said biasing member is a spherical member positioned between said power cord and said housing.

16. A power tool comprising:
a tool body having a housing;
a motor disposed in said housing;
a power cord connected to said motor; and
a cord protector operably engaging said power cord, said cord protector comprising at least one elastically-deformable biasing member engaging said power cord and exerting a biasing force upon said power cord in response to a load being applied to said power cord, said biasing member recovering to an initial position in response to removal of said load, said at least one biasing member is a leaf spring, said leaf spring being slidably coupled on opposing ends to said housing.

17. A power tool, comprising:
a tool body having a housing;
a motor disposed in said housing;
a power cord connected to said motor; and
a cord protector operably engaging said power cord said cord protector comprising at least one elastically-deformable biasing member engaging said power cord and exerting a biasing force upon said power cord in response to a load being applied to said power cord, said biasing member recovering to an initial position in response to removal of said load, said at least one biasing member is a torsion spring, said torsion spring being fixedly coupled on one end to said housing.

18. A power tool comprising:
a tool body having a housing;
a motor disposed in said housing;
a power cord connected to said motor;
a cord protector operably engaging said power cord, said cord protector comprising at least one elastically-deformable biasing member engaging said power cord and exerting a biasing force upon said power cord in response to a load being applied to said power cord, said biasing member recovering to an initial position in response to removal of said load; and
a tether operably coupling said power cord and said biasing member.

19. A power tool, comprising:
a tool body having a housing;
a motor disposed in said housing;
a power cord connected to said motor; and
a cord protector operably engaging said power cord, said cord protector comprising at least one elastically-deformable biasing member engaging said power cord and exerting a biasing force upon said power cord in response to a load being applied to said power cord, said biasing member recovering to an initial position in response to removal of said load, said biasing member is a piston device, said piston device comprising a piston member and a piston chamber, said piston member being fixedly coupled to said power cord and slidably disposed in said piston chamber to define a compressible pressure volume, said compressible pressure volume outputting an opposing biasing force in response to said load.

20. The power tool according to claim 19 further comprising:
an orifice channel extending through at least one of said piston member and said piston chamber, said orifice channel fluidly coupling said compressible pressure volume with atmosphere.

* * * * *